United States Patent

Tanaka

[11] Patent Number: 6,026,067
[45] Date of Patent: *Feb. 15, 2000

[54] METHOD AND APPARATUS FOR REPRODUCING AUDIO SIGNALS AT VARIOUS SPEEDS BY DIVIDING ORIGINAL AUDIO SIGNALS INTO A SEQUENCE OF FRAMES BASED ON ZERO-CROSS POINTS

[75] Inventor: Shin Tanaka, Ueda, Japan

[73] Assignee: Shinano Kenshi Kabushiki Kaisha, Nagano-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,909

[22] Filed: Apr. 7, 1997

[30] Foreign Application Priority Data

Dec. 27, 1996 [JP] Japan .................................. 8-350852

[51] Int. Cl.[7] ...................................................... G11B 7/00
[52] U.S. Cl. .................. 369/48; 369/54; 386/75
[58] Field of Search ................... 360/46, 51, 65; 386/75; 369/54, 59, 124, 48

[56] References Cited

FOREIGN PATENT DOCUMENTS

| 60-66365 | 4/1985 | Japan | 369/58 |
|---|---|---|---|
| 4-216353 | 8/1992 | Japan | 369/54 |
| 011567 | 12/1965 | United Kingdom . | |
| 599090 | 9/1981 | United Kingdom . | |

*Primary Examiner*—Nabil Hindi

[57] ABSTRACT

In a method of reproducing audio signals of the present invention, audio reproducing speed can be changed without changing tone and quality of audio signals. Audio signals are filtered to extract basic audio signals. Zero-cross points in the basic audio signals are detected. The original audio signals are divided into a plurality of frames on the basis of the zero-cross points on a time axis. The frames are thinned out, and the original audio signals are reproduced as voice on the basis of the frames left so as to accelerate reproducing speed. On the other hand, the original audio signals are reproduced by repeating the frame so as to make reproducing speed slower.

8 Claims, 6 Drawing Sheets

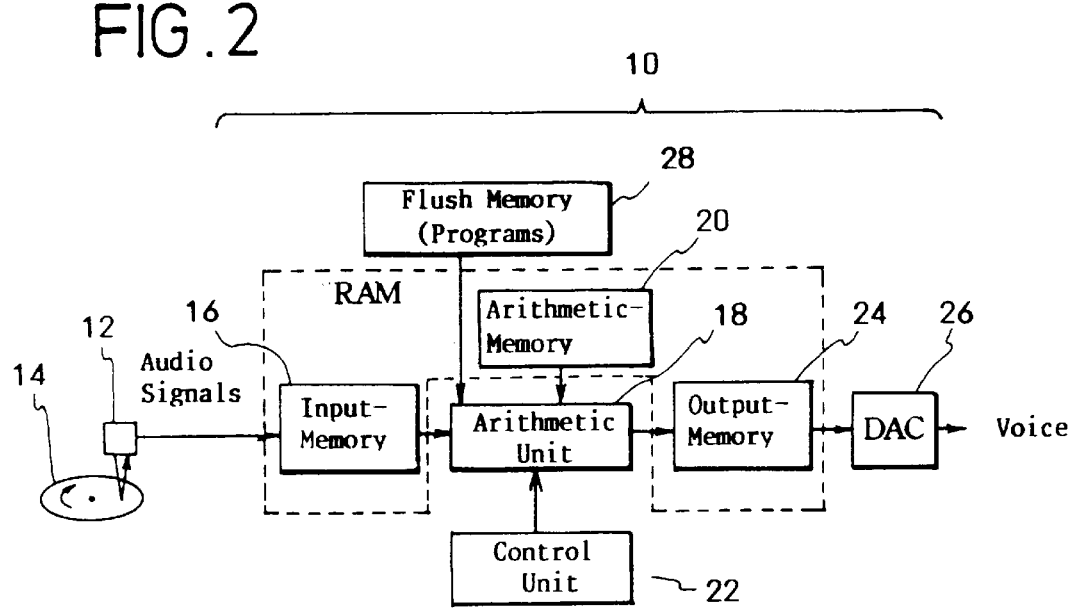
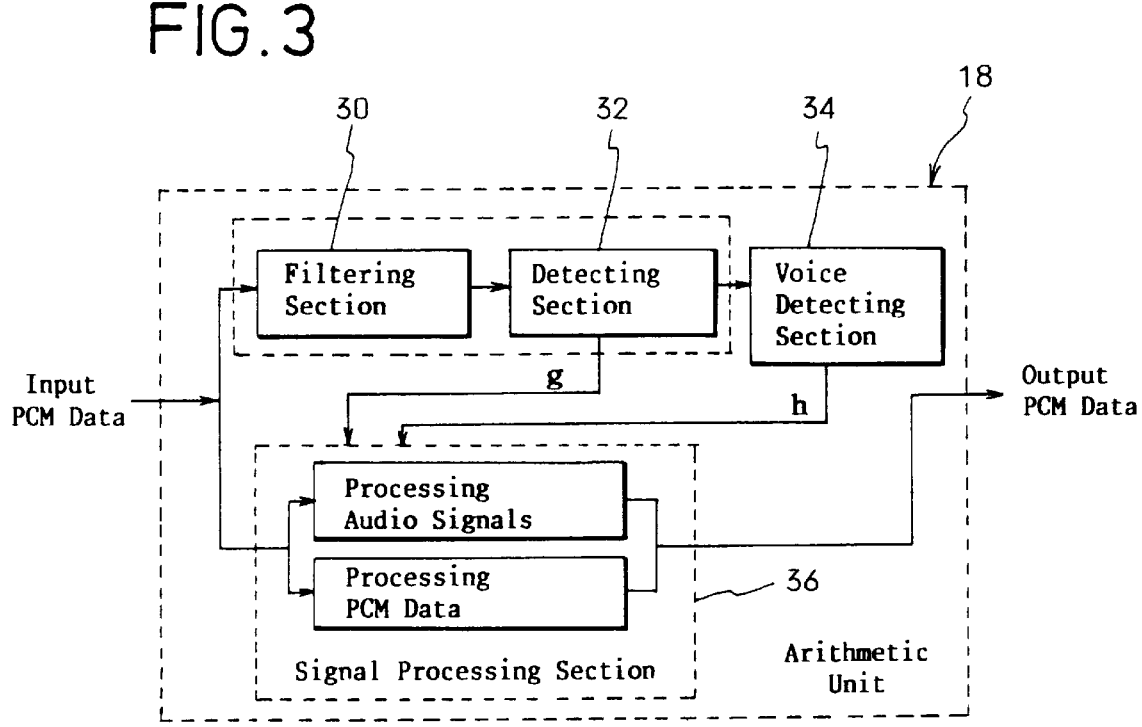

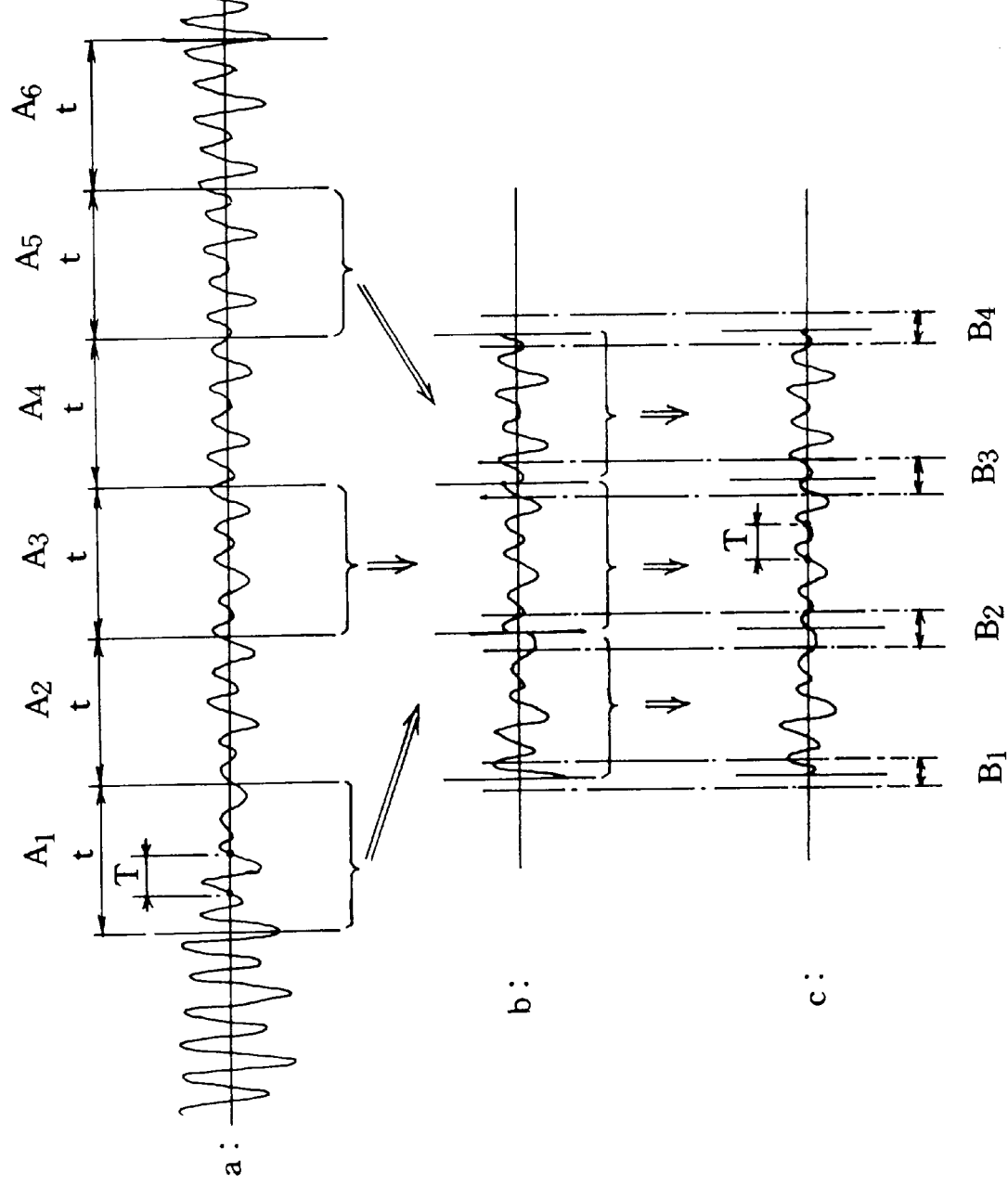

METHOD AND APPARATUS FOR REPRODUCING AUDIO SIGNALS AT VARIOUS SPEEDS BY DIVIDING ORIGINAL AUDIO SIGNALS INTO A SEQUENCE OF FRAMES BASED ON ZERO-CROSS POINTS

BACKGROUND OF THE INVENTION

The present invention relates to a method of reproducing audio signals and an audio player, more precisely relates to a method of reproducing audio signals which have been recorded on a recording medium, e.g., a compact disk (CD), as voice, and an audio player employing said method.

In some cases, the audio reproducing speed of an audio player, such as a CD player, a tape recorder, or a video player, must be slower or faster than the normal reproducing speed. For example, the reproducing speed is accelerated when a listener wants to listen the recorded audio data in a short time. On the other hand, the the reproducing speed is made slower if the audio data was rapidly recorded.

Conventionally, the rotational speed of a CD or running speed of a tape is changed to change the reproducing speed of the audio player.

By the conventional method of changing the reproducing speed, frequency of the audio signals, which have been read from the recording medium, e.g., the CD, is also changed according to the change of the reproducing speed, so that the tone of the reproduced voice is changed and worsened.

A conventional method of changing the reproducing speed while keeping the original tone will be explained with reference to FIG. 8. Original audio signals (a) are divided into a plurality of frames (A1, A2, A3, A4, A5, A6 . . . ), each of which has fixed time length (t). The audio reproducing speed can be changed by selecting the frames (A1, A2, A3, A4, A5, A6 . . . ). To reproduce audio signals twice as fast as the normal reproducing speed, for example, the frames (A1, A2, A3, A4, A5, A6 . . . ) are partially thinned out, and the audio signals corresponding to the frames left, e.g., the frames (A1, A3, A5 . . . ), are reproduced as voice. By this method, reproducing time of reproduced audio signals (c) can be half of original recording time. Namely, the listening time can be reduced to half. Further, frequency of the original audio signals (a) or cycle time (T) thereof is not so changed. Consquently, the audio signals (a) can be reproduced as the voice with original tone.

If the audio signals corresponding to the selected frames (A1, A3, A5 . . . ) are merely connected, the signals are not met in connecting sections (B1, B2, B3, B4) as shown audio signals (b), and uncomfortable noise is produced in each connecting section (B1, B2, B3, B4).

To reduce the noise, the signal level at an end point of one selected frame, e.g., the frame (A1), and signal level at a starting point of an adjacent selected frame, e.g., the frame (A3), are functionally coincided each other. An example of functional formula is, $$W(n) = 0.5 - 0.5 \cos(2\pi n/M)$$

n: signal level in the frame; and
M: n=0, 1, . . . M.

By this process, the original audio signals (a) can be formed into audio signals (c) which are continuous of the connecting sections (B1, B2, B3, B4), so that the uncomfortable noise in the reproduced audio signals (voice) can be reduced.

However, the conventional method has following disadvantages.

In the conventional method, the signal level of the original audio signals (a) in the connecting sections (B1, B2, B3, B4) must be changed to a prescribed level, e.g., zero, so the cycle time of the changed audio signals (c) in some connecting sections are quite different from that of the original audio signals (a). If the cycle time of the changed audio signals (c) is partially quite different from that of the original audio signals (a), the tone of the reproducing audio signals (voice) is quite different from the original voice. Further, the frequency of the reproduced audio signals (c) corresponding to the connecting sections (B1, B2, B3, B4) is also different from the original audio signals (a), so quality of sound or voice decreases.

SUMMARY OF THE INVENTION

An object of the present invention is to provide a method of reproducing audio signals, which is capable of changing the audio reproducing speed without changing the tone and the quality of audio signals. Another object is to provide an audio player employing such a method.

To achieve the objects, the present invention has following structures.

The first basic structure of the method comprises the steps of:
  filtering original audio signals, which have been recorded on a recording medium, to extract basic audio signals;
  detecting zero-cross points in the basic audio signals;
  dividing the original audio signals into a plurality of frames on the basis of the zero-cross points on a time axis; and
  thinning out the frames; and
  reproducing the original audio signals on the basis of the frames left so as to accelerate reproducing speed.

The second basic structure of the method comprises the steps of:
  filtering original audio signals, which have been recorded on a recording medium, to extract basic audio signals;
  detecting zero-cross points in the basic audio signals;
  dividing the original audio signals into a plurality of frames on the basis of the zero-cross points on a time axis; and
  reproducing the original audio signals by repeating the frame so as to make reproducing speed slower.

The first basic structure of the audio player comprises:
  a filtering section filtering original audio signals, which have been recorded on a recording medium, to extract basic audio signals;
  a detecting section detecting zero-cross points in the basic audio signals; and
  a signal processing section dividing the original audio signals into a plurality of frames on the basis of the zero-cross points on a time axis, thinning out the frames, and reproducing the original audio signals on the basis of the frames left so as to accelerate reproducing speed.

The second basic structure of the audio player comprises:
  a filtering section filtering original audio signals, which have been recorded on a recording medium, to extract basic audio signals;
  a detecting section detecting zero-cross points in the basic audio signals; and
  a signal processing section dividing the original audio signals into a plurality of frames on the basis of the zero-cross points on a time axis, and reproducing the original audio signals by repeating the frame so as to make reproducing speed slower.

In the present invention, the zero-cross points may be included in rising parts or in trailing parts of the basic signals.

In the method and the audio player of the present invention, the cycle time of the reproduced audio signals (voice) corresponding to the connecting sections between the frames is the same as that of the basic audio signals, and the signals are smoothly connected in the connecting sections. Thus, the audio signals can be reproduced without changing the tone and the quality of audio signals even if the original audio signals are reproduced on the basis of the frames left so as to accelerate reproducing speed, or reproduced by repeating the frame so as to slow reproducing speed.

BRIEF DESCRIPTION OF THE DRAWINGS

An embodiment of the present invention will now be described by waty of example and with reference to the accompanying drawings, which are given by way of illustration only, in which:

FIG. 2 is a block diagram of an audio player of an embodiment of the present invention;

FIG. 3 is a block diagram of an arithmetic unit shown in FIG. 2;

FIG. 8 is an explanation view showing a process of the conventional audio player.

DETAILED DESCRIPTION OF A PREFERRED EMBODIMENT

A preferred embodiment of the present invention will now be described in detail with reference to the accompanying drawings.

Figure 1:
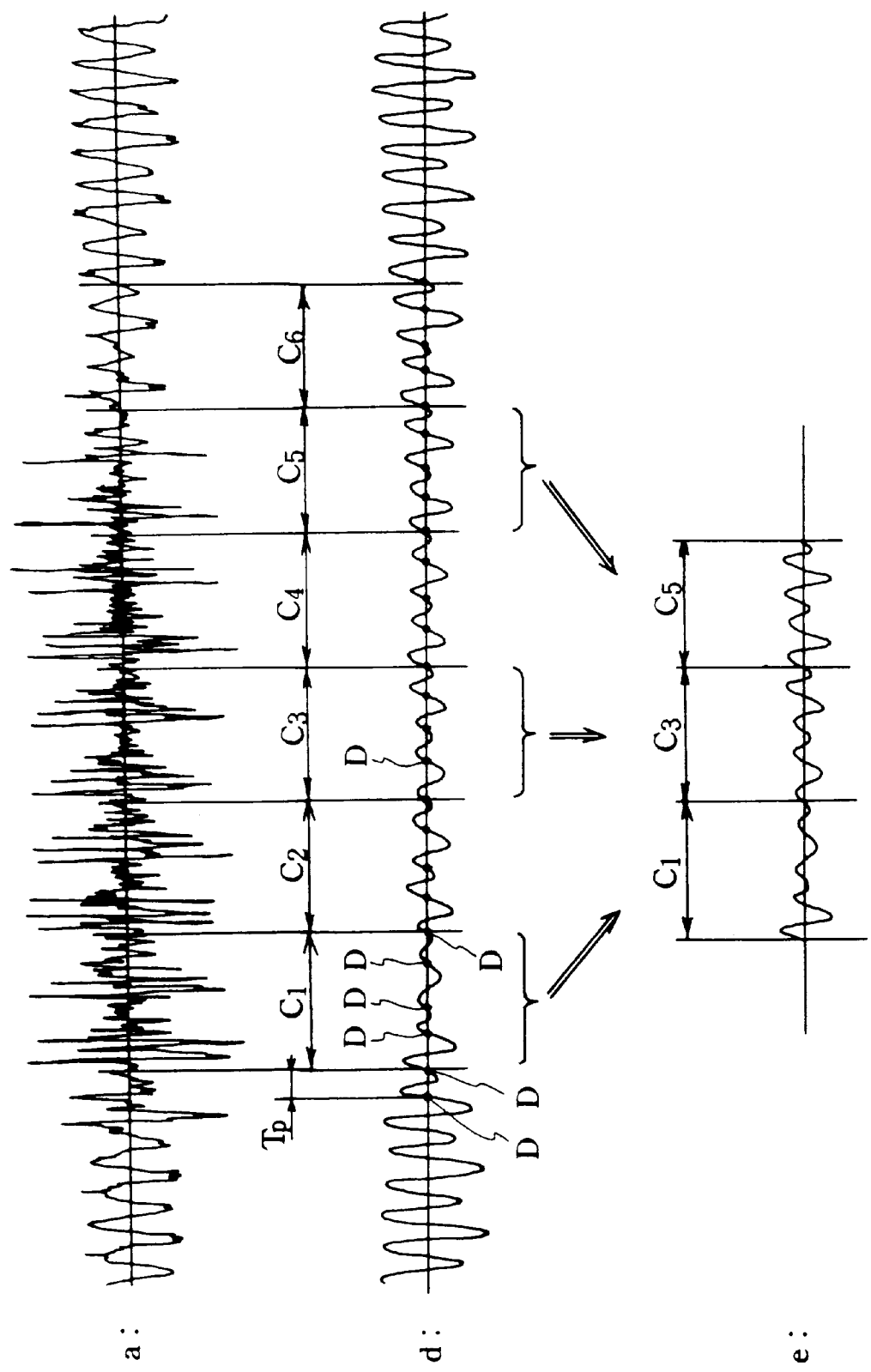
FIG. 1 is an explanation view showing a basic idea of the audio reproducing method of the present invention.

First, the basic idea of the method of reproducing audio signals of the present invention will be explained with reference to FIG. 1.

Sounds include: voiced sounds, e.g., vowel sounds, having cyclical wave forms and being generated by vibration of vocal cord; and unvoiced sounds, e.g., constant sounds [s], being generated by air flow passing through narrow spaces in the mouth without vibrating the vocal cord. If the voiced sounds are not mutually continuous in the connecting sections (B1, B2, B3, B4) of the frames (see FIG. 8), uncomfortable sounds (noise) are heard. On the other hand, even if the unvoiced sounds are not mutually continuous therein, less uncomfortable sounds are heard because the frequency of the unvoiced sounds are quite higher than the frequency of the voiced sounds (equal to the vibration frequency of the vocal cord: about 70–350 Hz). With this facts, even if the audio signals are reproduced as voice while thirning out the frames (A1, A2, A3, A4, A5, A6 . . . ) to accelerate the reproducing speed or repeating frames to make the reproducing speed slower, the tone, the sound level and the quality of sounds can be maintained by continuing voiced sounds in the connecting sections (B1, B2, B3, B4).

In the method of reproducing the audio signals, basic audio signals (d), which have basic frequency Fp and basic cycle time Tp, are extracted from original audio signals (a) by low-pass filtering. Zero-cross points (D) in rising parts or trailing parts of the basic signals (d) are detected. In FIG. 1, the zero-cross points (D) in the rising parts are shown. The zero-cross points (D) are shown as black circles on a time axis. The original audio signals (a) are divided into a plurality of frames (C1, C2, C3, C4, C5, C6), each of which has time length of 4×Tp.

In the case that the frames (C1, C2, C3, C4, C5, C6) are partially thinned out, e.g., skipping every second frame, to accelerate the reproducing speed, or that each frame (C1, C2, C3, C4, C5, C6) is repeated once or more to make the reproducing speed slower, reproduced audio signals (e) can be always continuous at the zero-cross points (D) in the connecting sections between the frames without adjusting signal levels. FIG. 1 shows the case of partially thinned out the frames (C1, C2, C3, C4, C5, C6) by skipping every second frame (C2, C4) to accelerate the reproducing speed, so the reproduced audio signals (e) are smoothly continued at the zero-cross points (D) in the connecting sections between the selected frames (C1, C3, C5). Further, since the zero-cross points (D) must be included in the rising parts (the case shown in FIG. 1) or the trailing parts of the basic signals (d), phases of the reproduced audio signals (e) are not inverted in the connecting sections, so that the reproduced audio signals (e) corresponding to the frame ((C1, C3, C5) left can be smoothly continued.

By the above-described method, the frequency of the reproduced audio signals (e) corresponding to the connecting sections between the frames is not highly shifted from the basic frequency Fp and the reproduced audio signals (e) can be continued in the connecting sections. Therefore, the tone and the quality of the reproduced audio signals (voice and sounds) cannot be kept. Note that, the basic signals (d) in the connecting sections are shown in FIG. 1 for explanation purposes, but the reproduced audio signals (e) are actually constituted by the original audio signals (a) corresponding to the selected frames (C1, C3, C5).

As described above, FIG. 1 shows the case of accelerating the reproducing speed faster than the normal speed. On the other hand, to make the reproducing speed slower than the normal reproducing speed, the original audio signals (a) of the frames (C1, C2, C3, C4, C5, C6) are continuously reproduced by repeating each frame (C1, C2, C3, C4, C5, C6) once or more. For example, the original audio signals (a) may be reproduced as following order: C1, C1, C2, C2, C3, C3, C4, C4, C5, C5, C6, C6. By this example, the original audio signals (a) can be reproduced 0.5 time as fast as the normal reproducing speed. If the original audio signals (a) are reproduced by the order of C1, C1, C2, C3, C4, C4, C5, C6, the original audio signals (a) can be reproduced 0.75 time as fast as the normal reproducing speed.

Next, the audio player employing the above described method will be explained with reference to FIGS. 2–7. Note that an audio reproducing circuit 10 of a CD-ROM book, which is an example of the audio player, will be explained, but magnetic tapes, flexible disks, IC cards including semiconductor memories, e.g., RAM, etc. may employed as recording media. Original audio signals (a), which are voice signals reading a story, are recorded on a CD as PCM data, which have been sampled at a prescribed sampling frequency.

Figure 6:
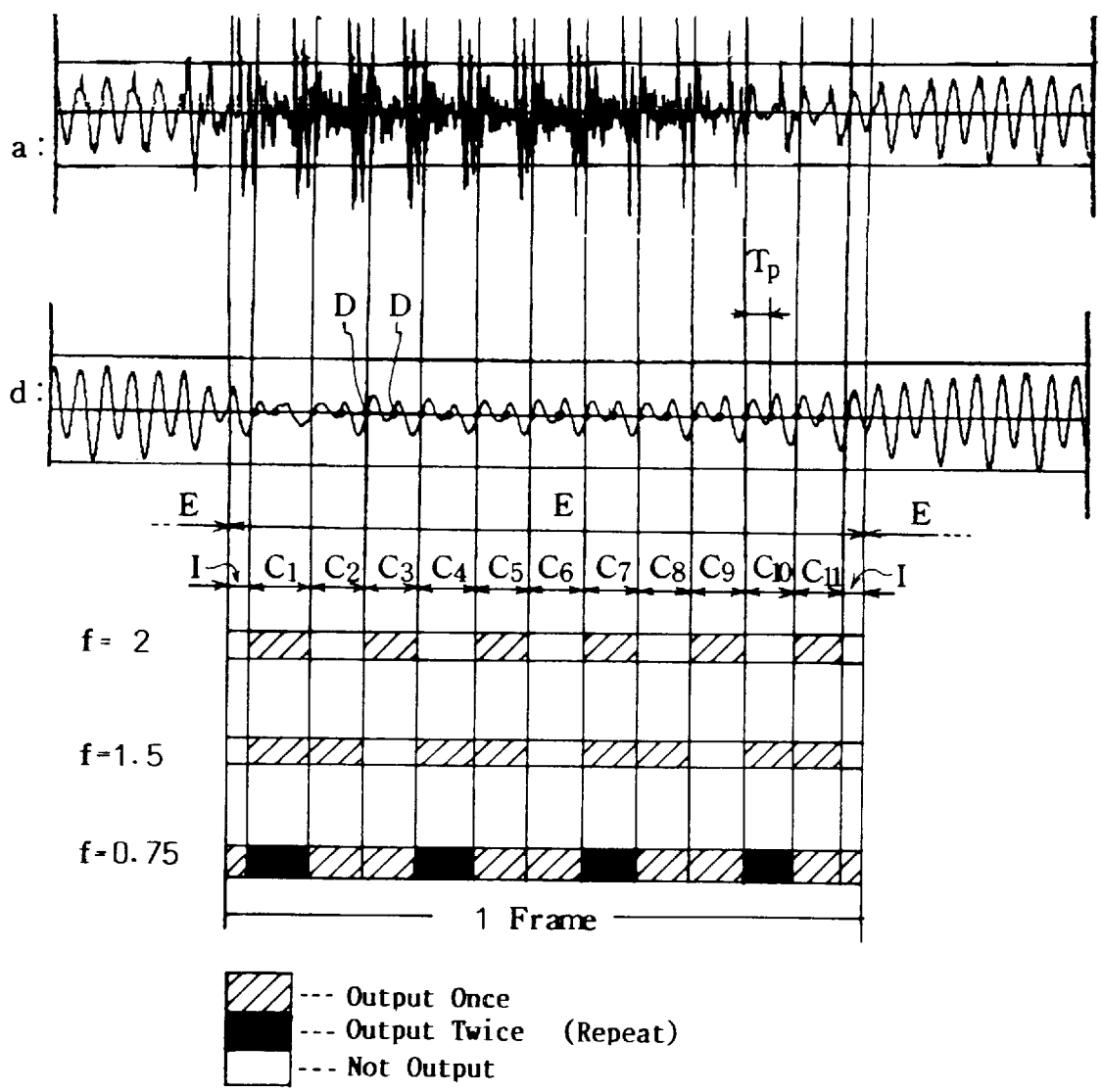
FIG. 6 is an explanation view showing a process of the case shown in FIG. 4.

The audio reproducing circuit 10 will be explained with reference to FIGS. 2 and 6.

The PCM data is read from the CD 14 by a reading section 12, which includes an optical pick-up, and inputted to the audio reproducing circuit 10.

The PCM data read by the reading section 12 is stored in an input-memory 16 in order.

An arithmetic unit 18 (a microprocessor) reads a prescribed amount of the PCM data, which equals the amount of data of a main frame (E), from the input-memory 16 in the order of storing, and stores them in an arithmetic-memory 20. The arithmetic unit 18 extracts the basic audio signals (d), which have the basic frequency Fp (slightly changed according to voice), from the original audio signals (a) of one main frame (E). Then the arithmetic unit 18 detects the zero-cross points (D) in the rising or the trailing parts of the basic audio signals (d). The original audio signals (a) of the main frame (E), which have been stored in the arithmetic-memory 20, are divided, by the zero-cross points on the time axis, into a plurality of sub frames (C1–C11). When the reproducing speed (f) is inputted by a control unit 22 (a microprocessor), if the reproducing speed(f) is faster than the normal reproducing speed, the arithmetic unit 18 thins out the sub frames (C1–C11) to omit a proper number of the sub frames, then the arithmetic unit 18 reads the data corresponding to the selected sub frames (sub frames left) from the arithmetic-memory 20 and stores the data in an output-memory 24 in order. On the other hand, if the reproducing speed (f) is slower than the normal reproducing speed, the arithmetic unit 18 repeats proper sub frames once or more, then the arithmetic unit 18 reads the data from the arithmetic-memory 20 according to the repeating order of the sub frames and stores the data in the output-memory 24 in order. The PCM data stored in the output-memory 24 will constitute the reproducing audio signals (e).

DAC (Digital to Analogue Converter) 26 continuously reads the data of the original audio signals (a) corresponding to the sub frames from the output-memory 24 at fixed speed. The data read is converted into analogue signals, and they can be reproduced as the reproduced audio signals (e) at the assigned reproducing speed (f). The reproduced audio signals (e), which have been outputted from the DAC 26, are outputted from a speaker (not shown) as voice.

Note that, the control unit 22 assigns the reproducing speed (f) to the arithmetic unit 18. Control programs for the the arithmetic unit 18 are stored in a flush memory 28. Capacity of the input-memory 16 and the output-memory 24 are designed according to processing speed of the arithmetic unit 18. Specifically, the memories 16 and 24 do not become empty or full while operating. A memory space of one memory unit may be divided as the memories 16, 20 and 22.

The arithmetic unit 18 will be explained with reference to FIGS. 3–7.

A filtering section (digital filtering section) 30 filters the PCM data of the original audio signals (a) by low-pass filters to remove unvoiced parts, so the basic audio signals (d), whose basic frequency is Fp (about 70–350 Hz), can be extracted. In the present embodiment, a couple of IIR-type low pass filters are employed, and their cut off frequency is 200 Hz (the middle frequency of the basic frequency 70–350 Hz). By using this filters, the basic audio signals (d) having the basic frequency Fp and the basic cycle time Tp (see FIGS. 1, 6 and 7) are outputted from the filtering section 30.

A detecting section 32 detects the zero-cross points (D), which are included in the rising (or the trailing) parts of the basic audio signals (d), of each main frame (E). In the present embodiment, the zero-cross points (D) in the rising parts of the basic audio signals (d) are detected. The detecting section 32 divides the basic audio signals (d) of one main frame (E), by the zero-cross points (D), into a plurality of sub frames (C1, . . . Cn; "n" being a natural number), and each sub frame (C1, . . . Cn) has a prescribed time length, which is a prescribed times as long as the basic cycle time Tp. The detecting section 32 outputs address data of the connecting sections between the adjacent sub frames, e.g., a position from a starting point of the sub frame, which is stored in the arithmetic-memory 20 as zero-cross data (g).

A voice detecting section 34 detects if the detecting section 32 detects the zero-cross points (D) or not. When the detecting section 32 detects no zero-cross point (D), the voice detecting section 34 outputs no-voice signals (h), which indicate unvoiced sounds or that no voice is recorded. Note that, the detecting section 32 may output the no-voice signals (h) instead of the voice detecting section 34.

A signal processing section 36 defines the reproducing speed (f) when the control unit 22 assigns the reproducing speed (f). Namely, the reproduced audio signals (e) are reproduced at the assigned speed, which is f ("f" is a positive real number) times as fast as the normal reproducing speed. In the case of detecting the zero-cross points (D) in the main frame (E), the action of the signal processing section 36 is different from that in the case of detecting no zero-cross points (D).

First, the case of detecting the zero-cross points (D), namely the case that no no-voice signals (h) are sent from the voice detecting section 34 will be explained.

Figure 4:
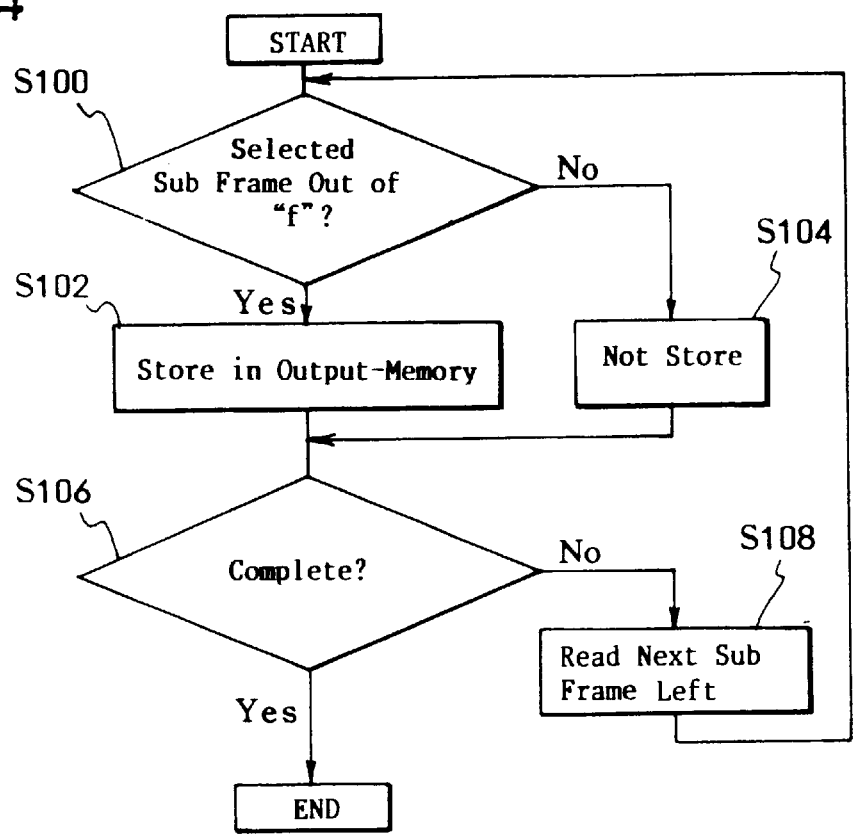
FIG. 4 is a flow chart showing the opening steps performed by the audio player shown in FIG. 2, wherein original audio signals in a main frame are voice.

As shown in FIG. 4, the signal processing section 36 counts a number of the sub frames (C1, . . . Cn) on the basis of the zero-cross data (g) and reads the original audio signals (a) from the arithmetic-memory 20. The signal processing section 36 selects one sub frame out of every group of the sub frames, in which the sub frames of number "f" (a natural number) are included, on the basis of a predetermined rule (STEP S100). The original audio signals (a) of the selected sub frames are stored in the output-memory 24 (STEP S102); the original audio signals (a) of the non-selected (skipped or thinned out) sub frames are not stored (STEP S104). Note that, to continuously reproduce the audio signals (voice), the original audio signals (a) corresponding to the selected sub frames are stored in the output-memory 24 in the form of the reproduced audio signals(e).

The signal processing section 36 detects if any sub frames are left, in the main frame (E) stored in the arithmetic-memory 20 or not (STEP S106). If there is a sub frames left in the main frame (E), the signal processing section 36 reads the sub frame left (STEP S108) and returns to STEP S100. On the other hand, if there are no sub frames left in the main frame (E), the signal processing section 36 stops processing the original PCM data (a) of the main frame (E) stored in the arithmetic-memory 20. Note that, in the case that there is a remainder (I), whose length is shorter than the cycle time Tp, at the end of the main frame (E), the remainder (I) is stored in the arithmetic memory 20, and the remainder (I) will be added to next one main frame (E). Namely, length of the remainder (I) is added to the length of the next main frame (E).

Upon completing to process the PCM data of the original audio signals (a) of the main frame (E) stored in the arithmetic-memory 20, the arithmetic unit 18 reads the PCM data of the next main frame (E) from the input-memory 16 and stores this data in the output-memory 20, then repeats the above described flow process.

Specific examples will be explained with reference to FIG. 6. In this example, the reproducing speed (f) is assigned to two (f=2), so the reproduced audio signals (e) are reproduced at the reproducing speed twice as fast as the normal reproducing speed. The signal processing section 36 counts the number of the sub frames (C1, . . . C11) from the first sub frame (C1). The signal processing section 36 selects one sub frame out of every group of the sub frames, in which two sub frames are included. The original audio signals (a) of the selected sub frames (shown as slashed area) are read from the arithmetic-memory 20 and stored in the output-memory 24 in order. The signal processing section 36 processes all main frames as well. With this action, the amount of the PCM data of the reproduced audio signals (e) in the output-memory 24 is made half, so the audio data (e) can be reproduced at the reproducing speed twice as fast as the normal reproducing speed.

In the case of "f"=1.5, namely the assigned reproducing speed is 1.5 time as fast as the normal reproducing speed, the signal processing section 36 selects two sub frames out of every group of the sub frames, in which three sub frames are included. The original audio signals (a) of the selected sub frames (shown as slashed area) are read from the arithmetic-memory 20 and stored in the output-memory 24 in order. With this action, the amount of the PCM data of the reproduced audio signals (e) in the output-memory 24 is made 2/3, so the audio data (e) can be reproduced at the reproducing speed 1.5 time as fast as the normal reproducing speed.

In the case of "f"=1, the signal processing section 36 selects one sub frames out of every group of the sub frame, in which one sub frame is included. Namely, every sub frame is selected, so the original audio signals (a) of all sub frames (C1–C11) are read from the arithmetic-memory 20 and stored in the output-memory 24. Thus, the audio data (e) can be reproduced at the normal reproducing speed.

Cases of "f"≧1 have been described above. If "f"<1, namely the reproducing speed is made slower, each sub frame or selected sub frames are repeated so as to make the amount of the PCM data of the reproduced audio signals (e) in the output-memory 24 as 1/f time as that of the PCM data of the main frame (E). Thus, the reproducing speed (f) can be made slower than the normal reproducing speed.

The example of slower reproducing speed will be explained with reference to FIG. 6. In the case of "f"=0.75, namely the assigned reproducing speed is 0.75 time as fast as the normal reproducing speed, the signal processing section 36 counts the number of the sub frames and reads the original audio signals (a) of each sub frame. The signal processing section 36 selects one sub frames out of every three sub frames and repeats to read the signals (a) of the selected sub frame. The original audio signals (a), which have been read and repeated by the signal processing section 36, are sequentially stored in the output-memory 24 in the read-and-repeat order. This process will be executed for all main frames (E). With this action, the amount of the PCM data of the reproduced audio signals (e) in the output-memory 24 is made 4/3 (=1/0.75), so the audio data (e) can be reproduced at the reproducing speed 0.75 time as fast as the normal reproducing speed. Namely, in this example, the original audio signals (a) of the selected sub frames (C1, C4, C7, C10), shown as black area, are repeated twice.

In some cases, depends on the value "f", the amount of the data in the main frame (E) does not match with that of the data in the output-memory 24. A value "(the amount of the data in the main frame)/(the data in the output-memory)" is made close to the assigned value "f" by selecting (thinning out) or repeating the sub frames.

Next, the case in which no zero-cross points are detected and the no-voice signals (h) are sent from the voice detecting section 34 will be explained.

Figure 5:
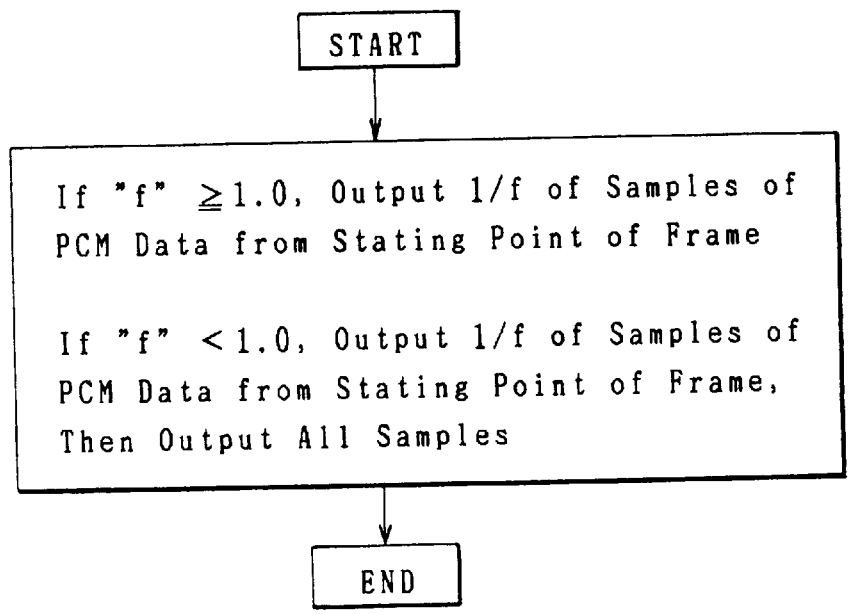
FIG. 5 is a flow chart showing the operating steps of the audio player shown in FIG. 2, wherein original audio signals in the main frame are not voice.

As shown in FIG. 5, if "f"≧1, "(number of the samples of the PCM data in one main frame)/f" (a positive integer) of the PCM data in the main frame (E) are read from the starting point of the main frame (E) and sequentially stored in the output-memory 24 in that order. With this process, the amount of the PCM data of the reproduced audio signals (e) of the main frame (E) in the output-memory 24 is made 1/f, so the audio signals (e) can be reproduced at the speed "f" times as fast as the normal reproducing speed.

Figure 7:
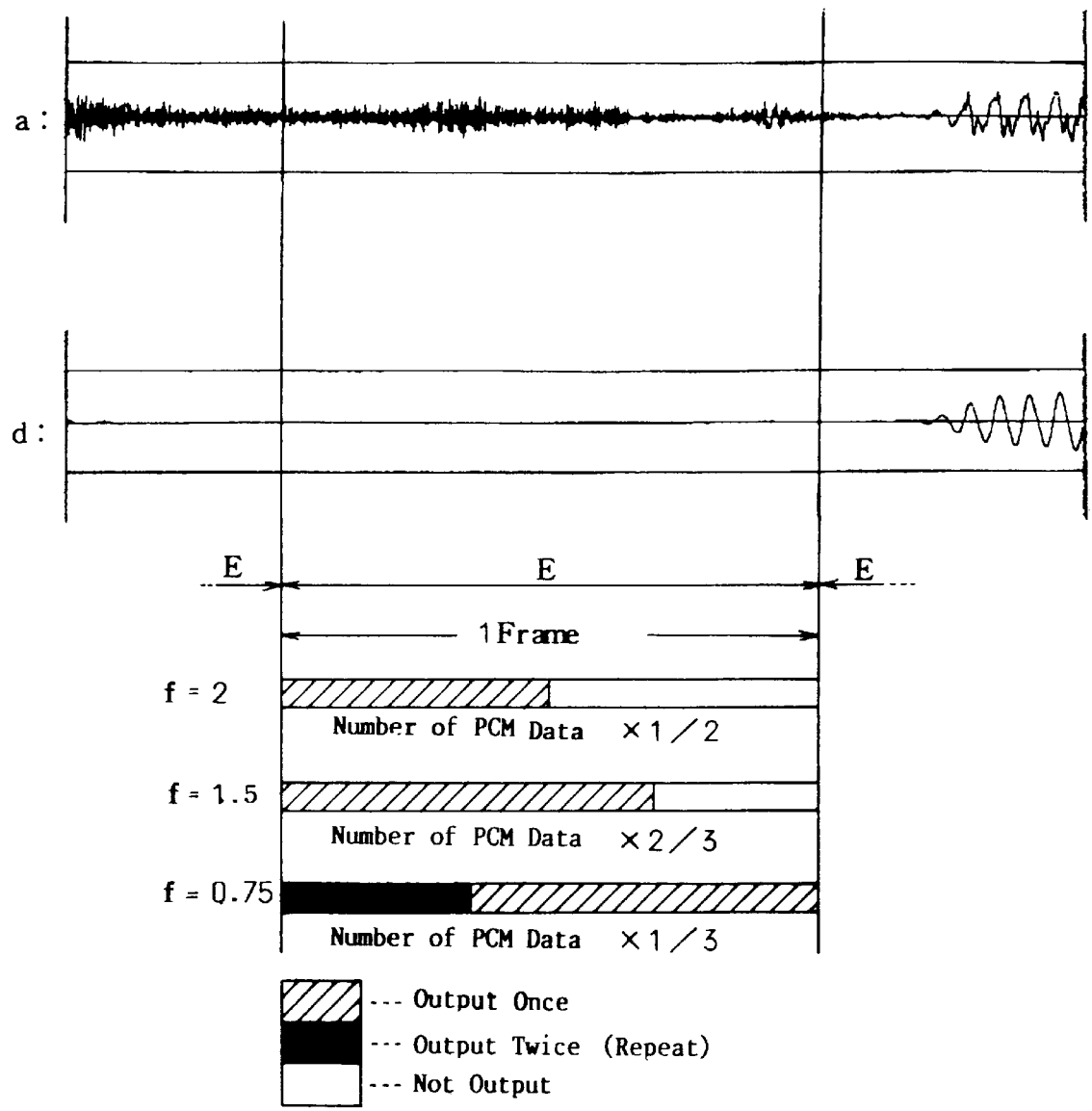
FIG. 7 is an explanation view showing a process of the case shown in FIG. 5.

A concrete example is shown in FIG. 7. When "f=2" is inputted, the reproducing speed is assigned to twice as fast as the normal reproducing speed. The signal processing section 36 reads 1/2 of the samples of the PCM data in the main frame (E) and sequentially stores the PCM data, which have been read, in the output memory 24. With this process, the amount of the PCM data of the reproduced audio signals (e) of the main frame (E) in the output-memory 24 is made 1/2, so the audio signals (e) can be reproduced at the speed twice as fast as the normal reproducing speed. In the case of "f=1.5" too, the signal processing section 36 processes the data by the same manner.

If "f"<1, "(number of the samples of the PCM data in one main frame)/f)−1" (a positive integer) of the samples of the PCM data in the main frame (E) are read from the starting point of the main frame (E) and sequentially stored in the output-memory 24 in that order. Then all PCM data in the main frame (E) are sequentially stored therein. With this process, the amount of the PCM data of the reproduced audio signals (e) of the main frame (E) in the output-memory 24 is made 1/f (f<1), so the audio signals (e) can be reproduced at the speed "f" (f<1) times as slow as the normal reproducing speed.

A concrete example is shown in FIG. 7. When "f=0.75" is inputted, the reproducing speed is assigned to 0.75 times as slow as the normal reproducing speed. The signal processing section 36 reads "1/0.75−1(=1/3)", of the samples of the PCM data in the main frame (E) and sequentially stores the PCM data, which has been read, in the output-memory 24. Then all PCM data in the main frame (E) is sequentially stored therein. With this process, the amount of the PCM data of the reproduced audio signals (e) of the main frame (E) in the output-memory 24 is made 4/3 (=1/3+1=1/f), so the audio signals (e) can be reproduced at the speed 3/4 (f) time as slow as the normal reproducing speed.

If main frames (E), in which no sounds are included, are continued, the above described process will be repeated.

Further, in the case of "f<0.5", even if all sub frames are repeated once, or all samples of the PCM data are repeated when no voice signal (h) is sent, the amount of the PCM data stored in the output-memory 24 is made only double with respect to the amount of data in the main frame (E). To increase the amount of the PCM data in the output-memory 24 according to the assigned "f" value, all or selected sub frames are repeated twice or more, or required amount of the PCM data are repeated required times when no voice signal (h) is sent. By repeating twice or more, the required number of samples of the PCM data can be stored in the output-memory 24, and the reproduced audio signals (e) can be reproduced at the assigned reproducing speed (f<0.5).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of of equivalency of the claims are therefore intended to be embraced therein.

What is claimed is:

1. A method of reproducing audio signals, comprising the steps of:

reading a predetermined amount of original audio signals from a recording medium;

filtering said original audio signals to extract basic audio signals;

detecting zero-cross points in said basic audio signals;

dividing said original audio signals into a plurality of frames, each having a starting point and a terminating point which corresponds to a detected zero-cross point on a time axis;

thinning out said plurality of frames;

monitoring the results of said detecting step to recognize no zero-cross point sections of said basic audio signals for which said detecting step fails to detect zero-cross points;

reducing an amount of original audio signal data for portions of said original audio signals which correspond to no zero-cross point sections of said basic audio signals recognized by said monitoring step, the amount of reduction being based on a desired accelerated reproducing speed; and reproducing the original audio signals in accordance with the results of said thinning and reducing steps to accelerate reproducing speed.

2. The method according to claim 1, wherein said zero-cross points are included in rising parts of said basic audio signals.

3. The method according to claim 1, wherein said zero-cross points are included in trailing parts of said basic audio signals.

4. An audio player, comprising:

a reading section for reading a predetermined amount of original audio signals from a recording medium;

a filtering section for filtering said original audio signals, to extract basic audio signals;

a detecting section for detecting zero-cross points in said basic audio signals;

thinning means for dividing said original audio signals into a plurality of frames, each having a starting point and a terminating point which corresponds to a detected zero-cross point along a time axis, and thinning out said plurality of frames;

voice detecting means for monitoring the results of said detecting section to recognize no zero-cross point sections of said basic audio signals for which said detecting section fails to detect zero-cross points;

reducing means for reducing an amount of original audio signal data for portions of said original audio signals which correspond to no zero-cross point sections of said basic audio signals recognized by said voice detecting means; and reproducing means for reproducing the original audio signals in accordance with the results of said thinning means and said reducing means to accelerate reproducing speed.

5. The audio player according to claim 4, wherein said zero-cross points are included in rising parts of said basic audio signals.

6. The audio player according to claim 4, wherein said zero-cross points are included in trailing parts of said basic audio signals.

7. The method according to claim 1, wherein said filtering step performs low-pass pass filtering to remove unvoiced portions from said original audio signals.

8. The audio player according to claim 4, wherein said filtering section performs low-pass filtering to remove unvoiced portions from said original audio signals.

* * * * *